United States Patent
Thomas

[19]

[11] Patent Number: 6,131,539
[45] Date of Patent: Oct. 17, 2000

[54] SYSTEM AND METHOD FOR ENHANCED ENGINE MONITORING AND PROTECTION

[75] Inventor: Eric D. Thomas, Canton, Mich.

[73] Assignee: Detroit Diesel Corporation, Detroit, Mich.

[21] Appl. No.: 09/345,052

[22] Filed: Jun. 30, 1999

[51] Int. Cl.[7] ........................................................ F01P 5/14
[52] U.S. Cl. .................................. 123/41.15; 123/196 S
[58] Field of Search ............................ 123/41.15, 196 S, 123/198 D; 701/112

[56] References Cited

U.S. PATENT DOCUMENTS

| | | | |
|---|---|---|---|
| 3,602,207 | 8/1971 | Kilmer | 123/179 |
| 3,841,291 | 10/1974 | Ludewig et al. | 123/198 DB |
| 4,019,489 | 4/1977 | Cartmill | 123/198 D |
| 4,064,746 | 12/1977 | Mercik, Jr. et al. | 73/116 |
| 4,136,329 | 1/1979 | Trobert . | |
| 4,189,707 | 2/1980 | Ermert . | |
| 4,242,728 | 12/1980 | Hartford | 364/431 |
| 4,450,801 | 5/1984 | Thedens et al. | 123/198 F |
| 4,475,493 | 10/1984 | Masteller et al. . | |
| 4,556,943 | 12/1985 | Pauwels et al. | 364/431.12 |
| 4,594,668 | 6/1986 | Fujawa et al. . | |
| 4,653,445 | 3/1987 | Book et al. | 123/198 DC |
| 5,070,832 | 12/1991 | Hapka et al. | 123/198 D |
| 5,315,972 | 5/1994 | Judy et al. | 123/198 D |
| 5,477,827 | 12/1995 | Weisman et al. | 123/436 |
| 5,664,539 | 9/1997 | Vieira . | |
| 5,732,676 | 3/1998 | Weisman et al. | 123/436 |
| 6,026,784 | 2/2000 | Weisman et al. | 123/436 |

*Primary Examiner*—Willis R. Wolfe
*Assistant Examiner*—Katrina B. Harris
*Attorney, Agent, or Firm*—Brooks & Kushman PC

[57] ABSTRACT

A system and method for monitoring and controlling an engine based on an engine fluid pressure include sensing an engine fluid pressure, determining a current value for an engine operating parameter, determining whether the engine fluid pressure has crossed a first threshold corresponding to the current value of the engine operating parameter, determining whether the engine fluid pressure has crossed a second threshold corresponding to the current value of the engine operating parameter, generating a warning signal when the fluid pressure has crossed the first threshold but has not crossed the second threshold, and generating a shutdown signal when the fluid pressure has crossed the second threshold. In one embodiment, the second threshold is determined based on the first threshold by applying a constant offset value.

16 Claims, 2 Drawing Sheets

SYSTEM AND METHOD FOR ENHANCED ENGINE MONITORING AND PROTECTION

TECHNICAL FIELD

The present invention relates to a system and method for monitoring engine operation and providing information to the operator or controlling the engine based on engine operating conditions.

BACKGROUND ART

In the control of internal combustion engines, the conventional practice utilizes electronic control units, volatile and non-volatile memory, input and output driver circuitry, and a processor capable of executing a stored instruction set, to control the various functions of the engine and its associated systems. A particular electronic control unit communicates with numerous sensors, actuators, and other control units necessary to effect various control and information functions of the engine and/or vehicle.

Various sensors are used to detect engine operating conditions which may affect control of the engine and/or vehicle. To provide information to the operator relative to engine operating conditions and/or control the engine based on current engine operating conditions, conventional practice utilizes an engine operating parameter such as a coolant temperature or pressure, and compares the engine operating parameter with a limit which may vary as a function of a different engine operating parameter, such as throttle position, engine speed, or engine torque. If the engine operating parameter drops below the limit, the engine may automatically shut down, without first informing the operator, to protect the engine from damage.

Depending upon the particular engine or vehicle operating conditions, it may be undesirable to shut down the engine without first providing the vehicle operator an opportunity to take corrective action, or to override the requested engine shutdown. Furthermore, it is desirable to have sufficient confidence in the accuracy of sensor signals and other indicators which provide signals indicative of current engine operating conditions so that operator information or subsequent engine control is reliably performed.

Some prior art control systems provide a pressure limit or threshold as a function of engine speed. However, such systems may experience false alarms shortly after engine start-up or during other transient conditions where engine fluid pressures vary rapidly.

DISCLOSURE OF INVENTION

It is therefore an object of the present invention to provide a method and system for improving engine operating information relative to at least one engine fluid pressure.

Another object of the present invention is to provide a system and method for providing information and/or controlling the engine based on at least one fluid pressure selected from the group including engine coolant pressure and engine oil pressure.

An additional object of the present invention is to provide information relative to engine operating conditions prior to engine shutdown so the operator has an opportunity to take corrective action.

Another object of the present invention is to provide a customer configurable fluid pressure parameter.

In carrying out the above objects and other objects and features of the present invention a method for monitoring engine operating fluid pressures and/or controlling the engine based on at least one fluid pressure include measuring an engine fluid pressure, determining a value of an engine operating parameter, and determining whether the engine fluid pressure has crossed a first threshold corresponding to the determined value of the engine operating parameter. The method further determines whether the engine fluid pressure has crossed a second threshold corresponding to the current value of the engine operating parameter. An operator information display or device is activated when the fluid pressure crosses the first threshold but has not yet crossed the second threshold. An engine shut-down sequence is activated when the engine fluid pressure crosses the second threshold. In one embodiment of the present invention, the second threshold is determined based on a fixed offset from the first threshold.

In further carrying out the above objects and other objects, features and advantages of the invention, a computer readable storage medium is provided. The computer readable storage medium has information stored thereon representing instructions executable by a computer for monitoring engine operating fluid pressures and/or controlling the engine based on at least one fluid pressure. The computer readable storage medium includes instructions for measuring an engine fluid pressure, determining a value of an engine operating parameter, and determining whether the engine fluid pressure has crossed a first threshold corresponding to the determined value of the engine operating parameter. The computer readable storage medium also includes instructions for determining whether the engine fluid pressure has crossed a second threshold corresponding to the current value of the engine operating parameter and instructions for activating an operator information display or device when the fluid pressure crosses the first threshold but has not yet crossed the second threshold. In addition, the computer readable storage medium includes instructions for performing an engine shut-down sequence when the engine fluid pressure crosses the second threshold.

The present invention further includes a system for monitoring engine operation and providing enhanced engine protection. The system includes at least one engine fluid pressure sensor for providing an indication of a corresponding engine fluid pressure. Preferably, the pressure sensors include an engine coolant pressure sensor for measuring an engine coolant pressure and an engine oil pressure sensor for measuring an engine oil pressure. The system also includes a microprocessor in communication with the pressure sensors for determining whether at least one of the pressures has crossed a corresponding pressure threshold. The electronic control unit includes control logic for generating an engine warning signal if any of the fluid pressures have crossed corresponding pressure threshold, and for shutting down the engine when certain fluid pressures cross a corresponding second threshold to reduce the potential for significant engine damage.

The advantages accruing to the present invention are numerous. For example, the present invention provides improved engine monitoring which provides the operator with a warning before engine operating conditions indicate the engine should be shut down. In one embodiment, the present invention provides a second threshold while minimizing memory consumption and calibration time by utilizing a fixed offset from the first threshold. The present invention is applicable to any engine fluid pressure monitoring and control based on the engine fluid pressure(s). For example, engine coolant pressure, innercooler coolant pressure, oil pressure, and the like.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
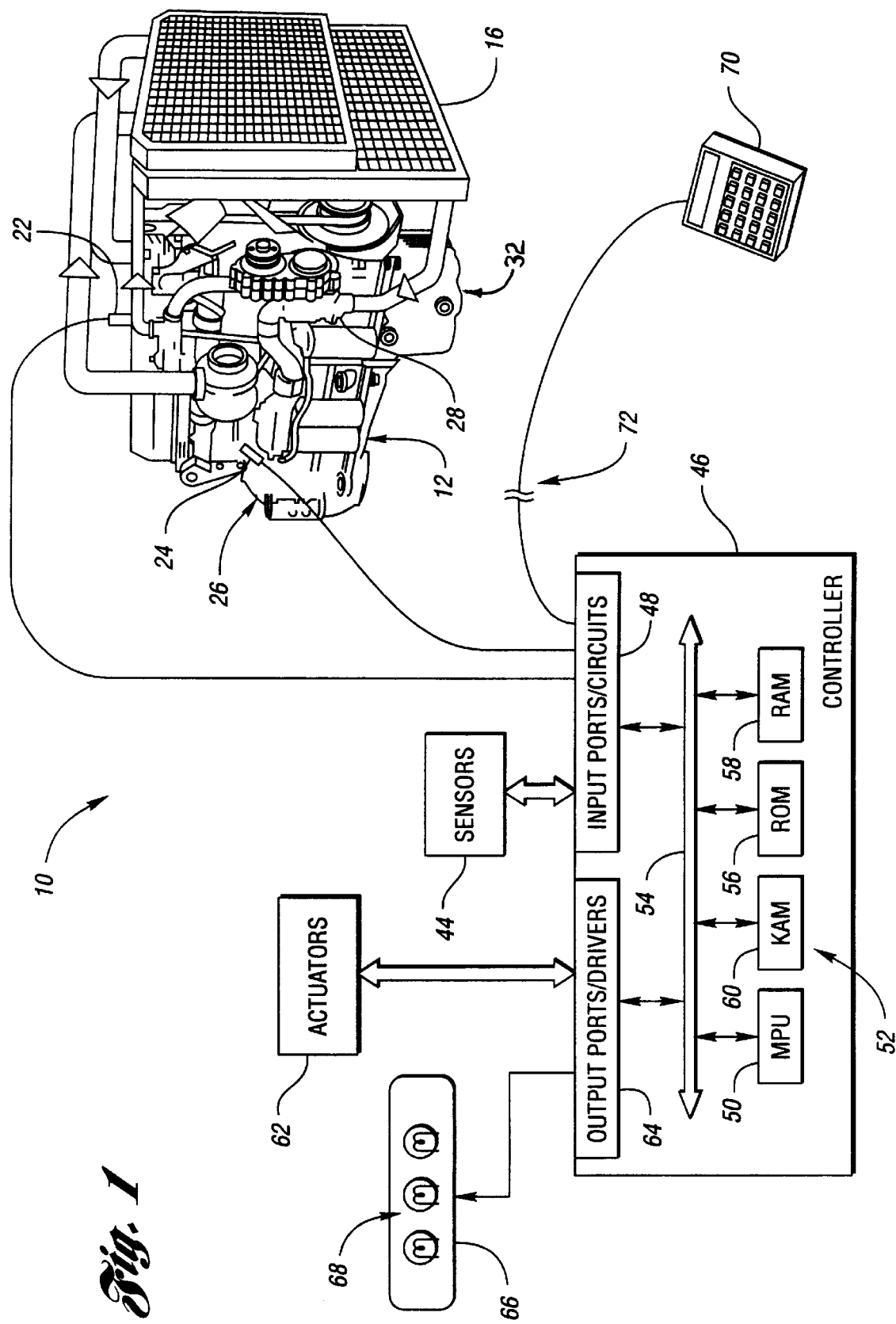
FIG. 1 is a schematic diagram of one embodiment for an engine monitoring and protection system based on engine fluid pressure according to the present invention.

Referring now to FIG. 1, a system for monitoring engine operation based on at least one fluid pressure according to the present invention is shown. Preferably, the at least one fluid pressure includes the coolant pressure and oil pressure. The system, generally indicated by reference numeral 10, includes an engine 12 having a plurality of cylinders. In a preferred embodiment, engine 12 is a multi-cylinder compression ignition internal combustion engine, such as a four, six, eight, twelve, sixteen or twenty-four cylinder diesel engine, for example. The system further includes an engine coolant heat exchanger 16.

As also illustrated in FIG. 1, system 10 includes an engine coolant pressure sensor 22, an oil pressure sensor 24, an engine coolant pump 28, and an engine oil pan 32.

Engine coolant heat exchanger 16 removes heat from the engine coolant using a conventional heat exchanger configuration as well known in the art. Preferably, the engine coolant sensor 22 measures the engine coolant pressure as the coolant exits the engine and travels toward heat exchanger 16. This location typically exhibits the maximum pressure of the engine coolant pressure relative to all other points within the cooling circuit. Engine coolant water pump 28 circulates the engine coolant through engine block 26 and through engine coolant heat exchanger 16. Oil pressure sensor 24 measures the oil pressure of the engine lubricating oil. Oil pressure sensor 24 is preferably located in the engine crankcase near the crankshaft bearings.

System 10 may also include various other sensors 44 for generating signals indicative of corresponding engine conditions or parameters of engine 12 or of the vehicle (not shown). Sensors 44 may include appropriate sensors for providing signals indicative of boost pressure, oil temperature, coolant temperature, oil level, fuel pressure, vehicle speed, and coolant level. Likewise, various switches connected to an operator interface may be provided to select various optional engine operating modes including stop engine override, selection and setting of cruise control, and the like. Engine and/or vehicle operating parameters or conditions may also be calculated, determined, or inferred based on one or more of the sensed parameters for operating conditions indicated by sensors 44.

Sensors 22, 24, and 44 are in electrical communication with a controller 46 via input ports and/or conditioning circuitry 48. A preferred embodiment of controller 46 includes a DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety. Controller 46 preferably includes a microprocessor 50 in communication with various computer readable storage media 52 via data and control bus 54. Computer readable storage media 52 may include any number of known devices which function as a read only memory (ROM) 56, random access memory (RAM) 58, keep alive memory (KAM) 60 and the like. The computer readable storage media may be implemented by any of a number of known physical devices capable of storing data representing instructions executable via a computer such as controller 46. Known devices may include but are not limited to, PROM, EPROM, EEPROM, flash memory, and the like in addition to magnetic, optical, and combination media capable of temporary or permanent data storage.

Computer readable storage media 52 include data representing program instructions (software), calibrations, operating variables and the like used in conjunction with associated hardware to effect control of various systems and subsystems of the vehicle, such as engine 12. Controller 46 receives signals from sensors 22, 24, and 44 via input ports 48 and generates output signals which may be provided to various actuators 62 and/or components via output ports 64. Signals may also be provided to a display device 66 which may include various indicators such as lights 68 to communicate information relative to system operation to the operator of the vehicle. Of course, alphanumeric, audio, video, or other displays or indicators may be utilized if desired.

With continuing reference to FIG. 1, control logic implemented by controller 46 and associated hardware and/or software is used to provide engine monitoring and protection according to the present invention. In a preferred embodiment, the control logic implemented by controller 46 monitors engine operation based on at least one fluid pressure and corresponding programmable or selectable pressure thresholds. Preferably, controller 46 determines whether the coolant pressure as indicated by the coolant pressure sensor 22 and the oil pressure as indicated by oil pressure sensor 24 have crossed respective pressure thresholds. As will be appreciated by one of ordinary skill in the art, control logic according to the present invention is preferably implemented by a programmed microprocessor operating as described in detail below. However, various alternative hardware and/or software may be used to implement the control logic without departing from the spirit or scope of the present invention.

A data, diagnostics, and programming interface 70 may be selectively connected to controller 46 via a connector 72 to exchange various information between controller 46 and the operator and/or service personnel. Interface 70 may be used to change values within the computer readable storage media 52, such as configuration settings, calibration variables, look-up table values, control logic, and the like. For example, interface 70 may be used to program or select pressure thresholds for each of the monitored fluid pressures according to the present invention.

Figure 2:
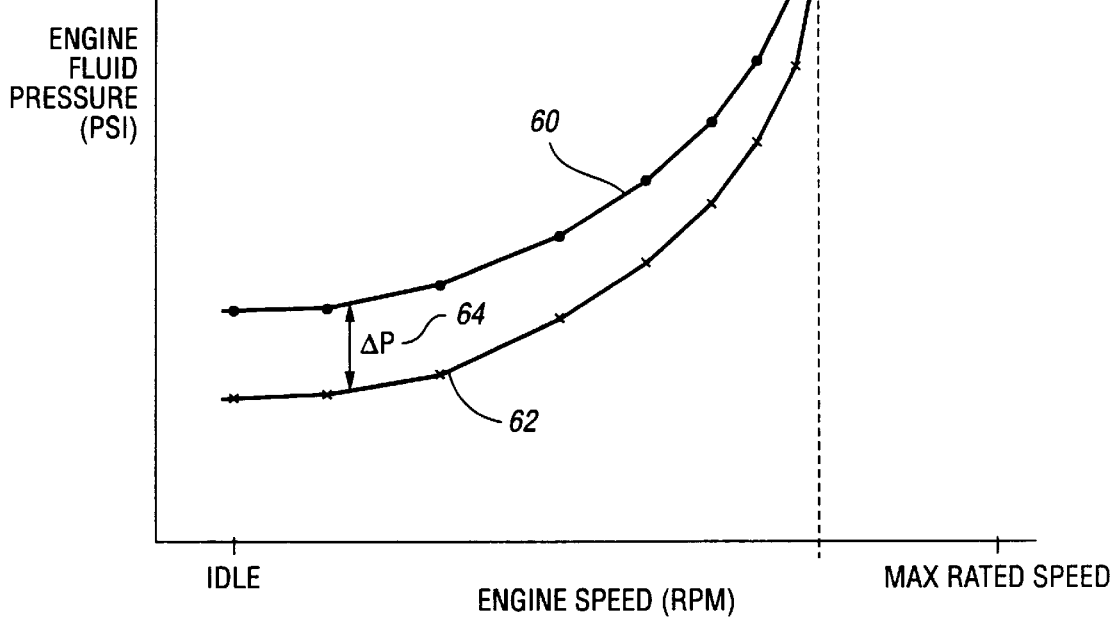
FIG. 2 is a graph depicting the warning pressure threshold and the engine shut-down pressure threshold curves, according to the present invention.

With reference to FIG. 2, a chart of engine fluid pressure as a function of an engine operating parameter (for example engine speed) is shown. In particular, a first pressure threshold 60 and a second pressure threshold 62 which vary as a function of engine speed are illustrated. The first pressure threshold 60 as well as the second pressure threshold 62 are developed through empirical testing and/or simulated computer testing of the engine, as well known in the art. In one embodiment, first threshold 60 represents a warning pressure threshold which is determined based on a constant offset 64 relative to the second threshold 62 which represents an engine shut-down pressure threshold. In this embodiment, the offset pressure is typically 5 PSI. Offset pressure 64 in combination with engine shutdown pressure represented by threshold 62 provides a threshold over a range of engine speeds from idle to the maximum rated engine speed, where an engine warning signal will be asserted.

As will be appreciated by one of ordinary skill in the art, the first and second thresholds may represent minimum or maximum thresholds used to monitor engine operation. For the embodiment of the invention illustrated in FIG. 2, thresholds 60 and 62 represent minimum thresholds such that the normal operating conditions for engine fluid pressures would be above first threshold 60. Depending on the particular application, first and second thresholds 60 and 62 may represent maximum or upper thresholds such that the normal operating conditions would be below second threshold 62. According to one preferred embodiment of the present invention, at least one of the thresholds is generated using a fixed offset from one of the other thresholds which includes values corresponding to various engine operating conditions, preferably stored in a look-up table referenced or indexed by another engine operating parameter.

In one embodiment of the present invention, a timer or counter is used to provide an averaging function and/or hysteresis in determining whether to activate a warning or initiate an engine shut down sequence. Depending upon the particular application, various types of timers and/or counters may be utilized. For example, an integrating timer/counter may be utilized which provides an averaging function for the pressure signal. When controller 46 determines that a pressure signal has crossed a corresponding threshold, such as threshold 60, the timer/counter begins incrementing and accumulating time. When the pressure signal crosses the threshold in the opposite direction, the timer/counter begins decrementing (to a minimum value of zero). The warning signal or shutdown sequence is not triggered unless the timer/counter reaches some predetermined time or value. Alternatively, a count/reset timer/counter may be used which begins incrementing when the threshold is crossed in one direction and resets to zero when the threshold is crossed in the opposite direction. Of course, for either timer/counter, the behavior of the timer/counter depends on whether the threshold is an upper/maximum or lower/minimum threshold.

In a preferred embodiment of the present invention, engine monitoring includes determining when any one of the monitored fluid pressures is below its associated pressure threshold for the current engine operating conditions. For example, if either the engine coolant pressure or the engine oil pressure is below its associated first threshold corresponding to the current engine speed for a certain time, an appropriate signal is generated to activate a warning device or message. While calibrations will vary by application, typical threshold values for coolant pressure and oil pressure are 75 PSI and 150 PSI, respectively. However, in one embodiment of the present invention, each of the pressure thresholds may be set to any value between 0 PSI and 255 PSI since one byte of memory is allocated to each calibration and scaled accordingly. In this embodiment, when controller 46 determines that all of the monitored fluid pressures are above the warning pressure threshold 60, engine malfunction is no longer indicated and the respective signals are not asserted.

Figure 3:
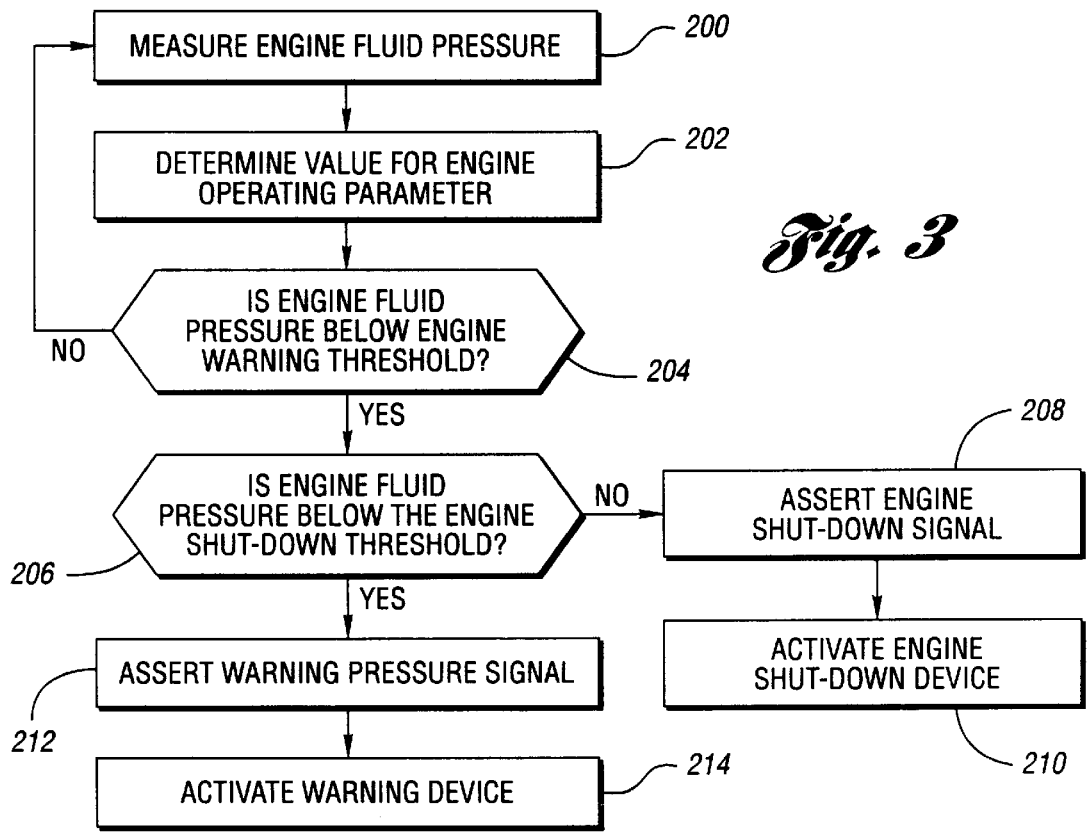
FIG. 3 is a block diagram illustrating operation of a system or method according to the present invention for engine monitoring and protection.

Referring now to FIG. 3, a flow chart illustrating operation of a system or method for detecting an engine malfunction according to the present invention. As will be appreciated by one of ordinary skill in the art, the flow chart represents control logic which may be implemented or effected in hardware, software, or a combination of hardware and software. The various functions are preferably effected by a programmed microprocessor such as the DDEC controller, but may include one or more functions implemented by dedicated electric, electronic, or integrated circuits. As will also be appreciated, the control logic may be implemented using any one or a number of known programming and processing techniques or strategies, and is not limited to the order or sequence illustrated here for convenience only. For example, interrupt or event driven processing is typically employed in real-time control applications, such as control of the vehicle engine or transmission. Likewise, parallel processing, multitasking, or multi-threaded systems and methods may be used to accomplish the objectives, features, and advantages of the present invention. The present invention is independent of the particular programming language, operating system, processor, or circuitry used to implement the control logic illustrated.

With continuing reference to FIG. 3, an engine fluid pressure (EFP) is measured as represented by block 200. The engine fluid may be engine coolant, engine oil, or other engine fluid indicative of engine operating conditions. An engine operating parameter such as engine speed, throttle position, or the like is determined as represented by block 202. EFP is compared to a first threshold 60 which represents the engine warning pressure threshold in this embodiment, as represented by block 204. If EFP has crossed the first threshold, i.e. if EFP is below the engine warning pressure threshold, control passes to block 206 where controller 46 determines whether EFP has crossed second threshold 62 as represented by block 206. If EFP is below the engine shut-down pressure threshold, the engine shut down signal is asserted as represented by block 208. Depending upon the particular application and the particular fluid pressure being monitored, engine shutdown may be performed by an external device as represented by block 210 or by the engine controller. For example, the engine controller may ramp down the available engine torque and then cut off fuel supplied to the cylinders to stall the engine. The operator may be provided an opportunity to override the engine shutdown using an appropriate switch or appropriate actuation of the accelerator pedal. The engine signal may also be recorded as a code in non-volatile memory to assist maintenance personnel in diagnosing any unusual engine operating conditions. In one embodiment, diagnostic information including the number of engine hours, the most recent reset, total time of warning/shutdown signal, and most extreme value of monitored fluid pressure are also stored for subsequent troubleshooting.

If EFP has crossed the first threshold but has not crossed the second threshold, an engine warning signal is asserted as represented by block 212 which activates an associated indicator represented by block 214. The process repeats at predetermined periodic time intervals while the engine is running as the microprocessor continues to execute the instructions and re-evaluate the engine operating conditions.

As such, the present invention provides improved engine monitoring which provides the operator with a warning before engine operating conditions indicate the engine should be shut down. The present invention provides first and second thresholds which may function as either upper/maximum or lower/minimum thresholds. In one embodiment, the present invention provides a second threshold while minimizing memory consumption and calibration time by utilizing a fixed offset from the first threshold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an engine, the method comprising:

sensing an engine fluid pressure;

determining a current value for an engine operating parameter;

determining whether the engine fluid pressure has crossed a first threshold corresponding to the current value of the engine operating parameter;

determining whether the engine fluid pressure has crossed a second threshold corresponding to the current value of the engine operating parameter;

generating a warning signal when the fluid pressure has crossed the first threshold but has not crossed the second threshold; and generating a shutdown signal when the fluid pressure has crossed the second threshold.

2. The method of claim 1 wherein the step of sensing an engine fluid pressure comprises sensing an engine coolant pressure.

3. The method of claim 1 wherein the step of sensing an engine fluid pressure comprises sensing an engine oil pressure.

4. The method of claim 1 wherein the step of generating a warning signal comprises activating a visual indicator.

5. The method of claim 1 wherein the step of generating a shutdown signal comprises reducing available engine torque.

6. The method of claim 1 wherein the step of determining a current value for an engine operating parameter comprises determining a current engine speed.

7. The method of claim 1 wherein the step of determining whether the engine fluid pressure has crossed a second threshold comprises determining the second threshold based on the first threshold for the current value of the engine operating parameter.

8. The method of claim 1 wherein the step of determining whether the engine fluid pressure has crossed a first threshold comprises determining whether the engine fluid pressure is below the first threshold.

9. A system for monitoring and controlling an engine, the system comprising:

an engine fluid pressure sensor for measuring an engine fluid pressure;

an engine operating parameter sensor for measuring an engine operating parameter; and a controller in communication with the engine fluid pressure sensor and the engine operating parameter sensor, the microprocessor including control logic for comparing the engine fluid pressure to an associated first engine pressure threshold, comparing the engine fluid pressure to an associated second engine pressure threshold, and generating an engine warning signal when the engine fluid pressure crosses the first threshold but before the engine fluid pressure crosses the second threshold.

10. The system of claim 9 wherein the engine fluid pressure is an engine coolant pressure.

11. The system of claim 9 wherein the engine fluid pressure is an engine oil pressure.

12. The system of claim 9 further comprising:

an engine warning indicator in communication with the controller, the engine warning indicator being activated when the engine fluid pressure is below the first threshold to alert an engine operator.

13. The system of claim 9 wherein the controller further comprises control logic for generating an engine shutdown signal when the engine fluid pressure crosses the second threshold.

14. The system of claim 13, wherein the controller further comprises control logic for controlling the engine based on the engine shutdown signal.

15. A computer readable storage medium having information stored thereon representing instructions executable by an engine controller in communication with at least one pressure sensor for detecting an engine malfunction, the computer readable storage medium comprising:

instructions for determining at least one fluid pressure;

instructions for determining a current value for an engine operating parameter;

instructions for determining a first pressure threshold value corresponding to the current value of the engine operating parameter;

instructions for determining a second pressure threshold value based on the first threshold;

instructions for comparing the at least one fluid pressure to the first and second thresholds to determine when the fluid pressure crosses the first and second thresholds;

instructions for generating an engine warning signal indicative of the fluid pressure crossing the first pressure threshold; and instructions for generating an engine shut-down signal indicative of the fluid pressure crossing the second pressure threshold.

16. The computer readable storage medium of claim 15 further comprising:

instructions for initiating a timer when one of the first and second thresholds is crossed.

\* \* \* \* \*